H. R. SMITH.
Hay-Press.

No. 203,086. Patented April 30, 1878.

WITNESSES:
C. Neveux
C. Sedgwick

INVENTOR:
H. R. Smith
BY Munn & Co
ATTORNEYS.

UNITED STATES PATENT OFFICE.

HEMAN R. SMITH, OF MINNESOTA LAKE, MINNESOTA.

IMPROVEMENT IN HAY-PRESSES.

Specification forming part of Letters Patent No. 203,086, dated April 30, 1878; application filed January 21, 1878.

*To all whom it may concern:*

Figure 1:
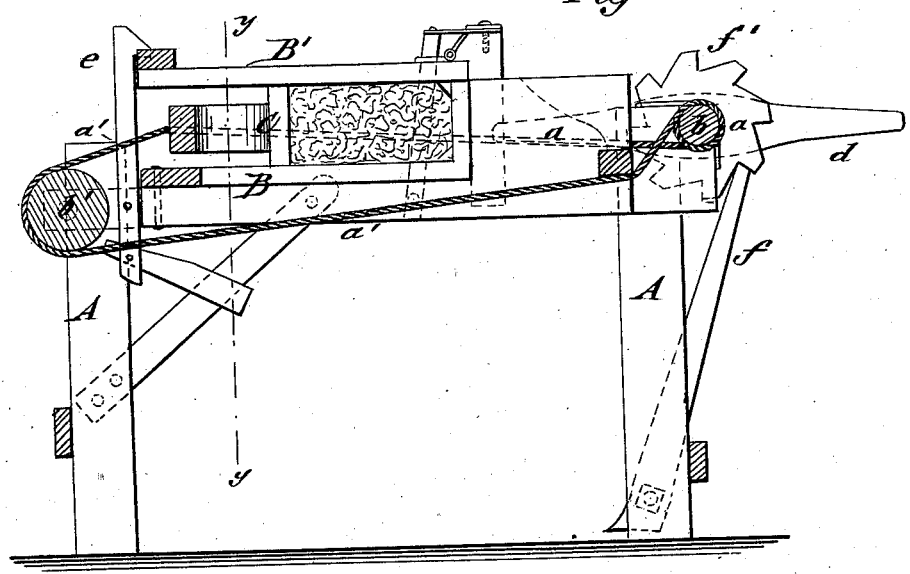
Figure 2:
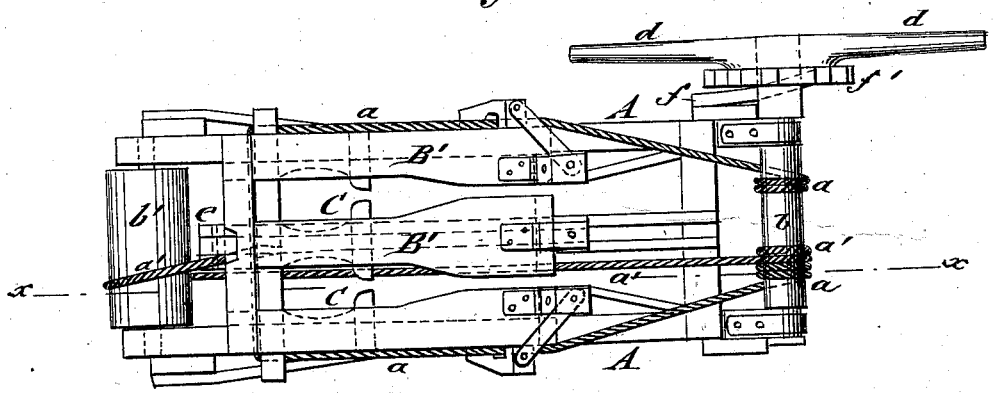
Figure 3:
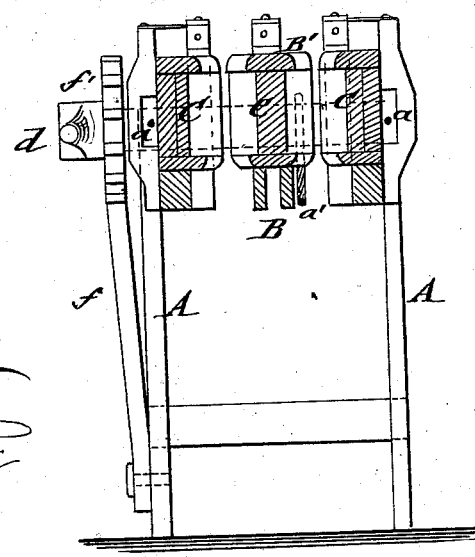

Be it known that I, HEMAN R. SMITH, of Minnesota Lake, county of Faribault, and State of Minnesota, have invented a new and Improved Hay-Press, of which the following is a specification:

In the accompanying drawing, Figure 1 represents a vertical longitudinal section on line $x\ x$, Fig. 2, of my improved hay-press; Fig. 2, a top view, and Fig. 3, a vertical transverse section of the same on line $y\ y$, Fig. 1.

Similar letters of reference indicate corresponding parts.

This invention has for its object to furnish a handy and effective press for baling hay in convenient manner, for the purpose of using it as fuel for heating and cooking stoves, steam-boilers, &c.; and the invention consists of a press-box, with reciprocating follower, operated by suitable lever mechanism. The press-box has a longitudinally-slotted top and bottom, and also a sectional follower for tying the hay-bands around the bale when held in compressed state. The slots of the top and bottom are wider at one end than at the other.

Referring to the drawing, A represents a supporting-frame of suitable strength, on which the horizontal press-box B is placed. A follower, C, is reciprocated therein, being operated by means of ropes $a$, that extend across the rear end of the follower, and pass along the sides and through perforated side guides of the press-box to a lateral drum or roller, $b$, at the end of frame A. The ropes $a$ are wound upon the roller $b$ by turning a hand-lever, $d$, of the roller-shaft, so as to move thereby the follower in forward direction. A third rope, $a'$, is attached to the center of the rear part of the follower, and passed around a pulley or roller, $b'$, at the opposite end of frame A, and below the press-box to the shaft-roller $b$, around which it is wound in opposite direction to the side ropes. By turning the lever in opposite direction, the follower is thereby carried in backward direction, so as to get the press-box ready to be charged with hay.

The press-box B is provided with a hinged top, B', that is raised for putting in the hay. Both the top and bottom of the press-box are slotted, the slots being narrower at the ends adjoining the hinges, but wider at the opposite ends, for the purpose of facilitating the passage of the hay-bands for tying them around the bale. The follower C is made of sections, with enlarged heads, that leave spaces just wide enough for the passage of the hay-bands. When the press-box is filled with hay, the top is lowered and locked into closed position by a catch device, $e$, that binds over the top. The follower is next moved forward by turning the lever, and a pivoted lever-pawl, $f$, thrown into a ratchet-wheel, $f'$, of the roller-shafts when the proper degree of compression is reached. The lever-pawl is retained in the teeth of the ratchet by pressing with the foot against the lower end, and dropped out of the ratchet by its own weight when the foot is removed. The pawl-and-ratchet mechanism retains the follower in fixed position on the hay, and admits the tying up of the same by the hay-bands on each side of the bale—the wider slots at one end and the open space of frame A at the other end of the press-box—leaving a convenient space to pass and tie the bands at either end. The follower is then moved back by dropping the lever-pawl and throwing the lever in opposite direction, the catch removed from the top, and the bale taken out. The press-box is then filled with the next charge of hay, and the same compressed and tied as before, forming thus the hay in compact bundles for convenient use for fuel.

I am aware that it is not broadly new to use a horizontally-reciprocating follower in a baling-press, and to provide the press-box with a hinged-top door for the introduction of the material to be pressed, and with a side door for the removal of a pressed bale.

Having thus fully described my invention, I claim as new and desire to secure by Letters Patent—

In a hay-press, the combination of a press-box having top and bottom, arranged with corresponding slots that are narrower at one end and wider at the opposite end, with a sectional follower having enlarged heads, with intermediate spaces of sufficient width to admit the passage of the hay-bands, substantially as described, and for the purpose specified.

HEMAN REED SMITH.

Witnesses:
E. S. LEAVITT,
W. W. WOODARD.